(12) United States Patent
Hartmann et al.

(10) Patent No.: US 11,814,553 B2
(45) Date of Patent: Nov. 14, 2023

(54) ADHESIVE

(71) Applicant: DOW SILICONES CORPORATION, Midland, MI (US)

(72) Inventors: Michael Hartmann, Wiesbaden (DE); Thierry Dessilly, Seneffe (BE)

(73) Assignee: DOW SILICONES CORPORATION, Midland, MI (US)

( * ) Notice: Subject to any disclaimer, the term of this patent is extended or adjusted under 35 U.S.C. 154(b) by 468 days.

(21) Appl. No.: 17/288,506

(22) PCT Filed: Oct. 30, 2019

(86) PCT No.: PCT/US2019/058734
§ 371 (c)(1),
(2) Date: Apr. 23, 2021

(87) PCT Pub. No.: WO2020/092483
PCT Pub. Date: May 7, 2020

(65) Prior Publication Data
US 2021/0380856 A1 Dec. 9, 2021

Related U.S. Application Data

(60) Provisional application No. 62/753,100, filed on Oct. 31, 2018.

(51) Int. Cl.
| | | |
|---|---|---|
| C09J 183/04 | (2006.01) | |
| C08G 77/08 | (2006.01) | |
| C08G 77/16 | (2006.01) | |
| C08G 77/20 | (2006.01) | |
| C08G 77/00 | (2006.01) | |
| C08K 3/04 | (2006.01) | |
| C08K 3/22 | (2006.01) | |
| C08K 3/26 | (2006.01) | |
| C08K 3/36 | (2006.01) | |
| C08K 5/5419 | (2006.01) | |
| C08K 5/5435 | (2006.01) | |
| C08K 5/544 | (2006.01) | |
| C08K 5/05 | (2006.01) | |
| C08L 83/04 | (2006.01) | |
| C08K 3/02 | (2006.01) | |
| C08K 5/57 | (2006.01) | |

(52) U.S. Cl.
CPC ............ *C09J 183/04* (2013.01); *C08G 77/08* (2013.01); *C08G 77/16* (2013.01); *C08G 77/20* (2013.01); *C08G 77/80* (2013.01); *C08K 3/02* (2013.01); *C08K 3/04* (2013.01); *C08K 3/22* (2013.01); *C08K 3/36* (2013.01); *C08K 5/544* (2013.01); *C08K 5/5419* (2013.01); *C08K 5/5435* (2013.01); *C08K 5/57* (2013.01); *C08L 83/04* (2013.01); *C08G 2170/00* (2013.01); *C08K 2003/2241* (2013.01); *C08K 2003/265* (2013.01); *C08L 2201/10* (2013.01); *C08L 2203/20* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 6,048,579 | A | 4/2000 | Wang et al. |
| 6,703,442 | B1 | 3/2004 | Ando et al. |
| 2010/0099793 | A1 | 4/2010 | Wunder |
| 2011/0042004 | A1 | 2/2011 | Schubert et al. |
| 2012/0029090 | A1 | 2/2012 | Brugger et al. |
| 2012/0107626 | A1 | 5/2012 | Schindler et al. |
| 2012/0108730 | A1 | 5/2012 | Zander et al. |
| 2013/0338289 | A1 | 12/2013 | Jadot et al. |
| 2014/0350175 | A1 | 11/2014 | Dinkar et al. |
| 2015/0094421 | A1 | 4/2015 | Patel et al. |
| 2015/0184043 | A1 | 7/2015 | Goubard et al. |
| 2015/0210909 | A1 | 7/2015 | Von Malotki et al. |
| 2015/0284609 | A1 | 10/2015 | Schlosser et al. |

FOREIGN PATENT DOCUMENTS

| | | |
|---|---|---|
| CA | 2768025 C | 2/2016 |
| CN | 101993521 A | 3/2011 |
| CN | 102432862 A | 5/2012 |
| CN | 102471399 A | 5/2012 |
| CN | 102803393 A | 11/2012 |
| CN | 104745113 A | 7/2015 |
| EP | 0473793 A1 | 3/1992 |
| EP | 0473792 B1 | 6/1996 |
| EP | 1090960 A1 | 4/2001 |
| EP | 0802233 B1 | 2/2004 |
| EP | 2106418 A1 | 10/2009 |
| WO | 9113928 A1 | 9/1991 |
| WO | 2015119904 A1 | 8/2015 |
| WO | 2018024865 A1 | 2/2018 |
| WO | 2020087316 A1 | 5/2020 |

OTHER PUBLICATIONS

International Search Report for PCT/US2019/058734 dated Jan. 20, 2020, 3 pages.
Machine assisted English translation of CN102277126B obtained from https://patents.google.com/patent on Jul. 20, 2021, 8 pages.
Machine assisted English translation of CN102504748A obtained from https://patents.google.com/patent on Jul. 20, 2021, 10 pages.
Machine assisted English translation of CN104877621A obtained from https://patents.google.com/patent on Jul. 20, 2021, 12 pages.
Machine assisted English translation of CN106753178A obtained from https://patents.google.com/patent on Jul. 20, 2021, 11 pages.

*Primary Examiner* — Barbara J Musser
(74) *Attorney, Agent, or Firm* — WARNER NORCROSS + JUDD LLP

(57) ABSTRACT

Described herein is a two-part condensation curable adhesive composition suitable for adhering a front lens having an inner surface coated with an anti-haze coating to a lamp body to create a sealed lamp unit. In general, once cured in place, residual ingredients from the adhesive composition or by-products of cure reactions thereof do not visibly inhibit functionality of the anti-haze coating of the sealed lamp unit.

20 Claims, No Drawings

ADHESIVE

CROSS-REFERENCE TO RELATED APPLICATIONS

This application is the National Stage of International Appl. No. PCT/US2019/058734 filed on 30 Oct. 2019, which claims priority to and all advantages of US Appl. No. 62/753,100 filed on 31 Oct. 2018, the content of which is hereby incorporated by reference.

TECHNICAL FIELD

This disclosure is concerned with the provision of condensation curable adhesives for use in particular, in the adhesion of a front lens pre-coated with an anti-haze coating onto a lamp body for lighting applications and to lamps comprising a lamp body and a front lens utilising said adhesives to adhere said lens to the lamp body whilst maintaining the integrity of the anti-haze coating on the lens.

BACKGROUND

Condensation curable adhesives are utilised in a variety of lighting and window applications. for the sake of example they may be used as adhesives for anti-fog windows; lenses for lighting applications and/or transparent covers for lighting applications such as automotive lighting, street lighting, outdoor lighting. Particularly important are their use in "high efficiency" lighting systems such as light emitting diode (LED) applications, organic LED applications, fluorescent lighting applications, vapor gas discharge lighting applications, and neon light applications.

One of the characteristics of high efficiency lighting applications is that they produce less heat than conventional light sources. These high efficiency lighting systems are often provided in enclosed housings. Lighting units e.g. vehicle headlamps often comprise a lamp body that defines a lamp chamber and has a front opening and a front lens which is designed to fit and engage the front opening and which is sealed in place with an adhesive e.g. a condensation curable organosiloxane based adhesive. A discharge lamp bulb located within the lamp chamber acts as a light source.

The front lens is typically transparent and may be made from a variety of materials, such as poly (methyl methacrylate) (PMMA) or polycarbonate resins. Such resins may be molded, extruded and/or thermoformed to make e.g. front lenses for lighting units and can improve the overall transparency and transmission of the lighting system. However, products made from polycarbonates and other resins suitable for making these lenses typically have hydrophobic surfaces. The hydrophobic nature of these surfaces when used as transparent front covers in sealed lighting units e.g. in LED systems, as well as other lower heat emitting light appliances can prove problematic when e.g. polycarbonate material is used for its optical qualities, high refractive index (RI) and/or optical clarity. This is because of the susceptibility to the accumulation of moisture/water droplets/particles on the surface of the resin which reduces the transparency and/or transmission of visible light through the material, particularly when accumulated on the inner surface of the transparent front cover in a sealed lighting unit such as a headlamp which is referred to in the industry as cold fogging or cold hazing.

Unfortunately, whilst saving energy, a side effect of the introduction of the highly efficient lighting systems is that, as previously indicated they generate less heat and therefore accumulated moisture on the surface of these lighting systems is less likely to evaporate during use. The aforementioned accumulation of moisture etc on the inner surface of transparent covers of the light units is referred to in the industry as "fogging" or "hazing". These terms are effectively interchangeable but henceforth will be referred to as hazing.

Assuming the front lens of a head lamp is made from a material having hydrophobic surfaces such as a polycarbonate resin (PC) the inner surface of the front lens is hydrophobic and is sealed into the lamp body. Automotive headlamps are not however, hermitically sealed but may have openings for pressure equilibration. These openings are sealed with membranes which let environmental air and humidity move in and out of the headlamp. Under specific environmental conditions (e.g. cold but high humidity), the humidity inside the headlamp can condense on the inner hydrophobic surface of the front lens in the form of very fine droplets which gives the appearance of a hazy film (or fog) from the outside resulting in reduced quality of lighting emanating from the lamp through the front lens.

Several solutions for overcoming this hazing or fogging issue have been developed. Perhaps the most common is the application of anti-haze-coatings (AHCs) onto the inner surface of the front lens. An AHC, once applied to the inner surface of a lens, creates a hydrophilic surface coating thereon so that whilst condensation on the surface may still occur the water is able to form a thin film which is no longer visible by end-users. However, when headlamps with an AHC coated inner surface of the lens are sealed with standard silicone adhesives, the hydrophilic nature of the AHC is destroyed after a short period of time due to outgassing and volatiles released into the lamp chamber from the silicone adhesives which may to interact with the AHC.

A wide range of ingredients can be incorporated into such commercial hydrophilic anti-fogging/anti-haze coating compositions which are designed to maximize the surface energy of the inner surface of such front covers. These may include hydrophilic organic substances including for example methylmethacrylate, diethyleneglycol-monomethyl ether methacrylate as well as hydrogels and gelatin.

Another solution is the introduction of anti-haze additives e.g. surfactants into the resins themselves during manufacture of the lenses. These are intended to function in a similar way to the coatings but without the need for application of such a coating on the inner surface of the lens, i.e. to provide a hydrophilic surface thereby preventing said inner surface of the lens from being subjected to the mist, condensation or other forms of hazing.

These additives include sorbitan esters, ethoxylated sorbitan esters, polyol esters and glycerol esters. Such additives have been successfully introduced into e.g. polyethylene and poly (vinyl chloride) material used in some fog resistant articles and avoiding the need for anti-haze coatings. However, they have been found to be generally unsuitable for use in polycarbonate and aromatic thermoplastic polymers.

Consequently, such transparent polymeric surfaces are often treated with one or more coatings to provide anti-fog performance, and scratch or abrasion resistance. Lens coatings can be applied in different ways, such as, for example, using a dip coating process or a spin coating process. Multiple coatings may also be necessary to obtain other properties such as a mirror coating, and stain and smudge resistance.

As previously described, the transparent front lenses for lighting units are generally designed to fit and engage into the front opening of a lamp chamber and are sealed in place using adhesives to form a sealed unit. Given their physical characteristics condensation cured silicone based adhesives are one of the most preferred adhesives for this application. Whilst these are excellent in the role of adhesive, the condensation cure mechanism and preferred choice of cross-linkers to cause cure will produce chemical by-products during the cure process inside the sealed unit.

The composition typically includes an —OH terminated polydimethylsiloxane polymer, a cross-linker such as methyl trimethoxysilane (having reactive methoxy groups which interact with —OH groups from the polydimethylsiloxane polymer to generate methanol as a by-product during the cure process. It has been found that condensation by-products and residual cross-linker material is often deposited on the AHC treated inner surface of the front lens and this deposition onto the anti-haze coating provided breaks down the integrity of the coating i.e. diminishes the effectiveness of the anti-haze coating or may even prevent it from functioning completely resulting with a gradual increase of hazing on the inner surface of the front cover. Similarly for systems where additives are introduced intro the polymer/resin materials during production, deposition of the cure by-products diminished or prevent the anti-haze function which again results in a gradual increase of hazing on the inner surface of the front cover. It has also been identified that some of the adhesion promoters used in assisting adhesion of the above silicone adhesives may also negatively affect the function of anti-haze coatings especially those which are volatile.

Condensation cure adhesives are one of the most suitable types of adhesives for sealing a front lens, pre-coated with an AHC coating, into a lamp body. However, the impact of by-products and/or residual ingredients, e.g. cross-linkers, from these adhesives deactivating pre-applied anti-haze coatings on e.g. the inner side of the lens, which in use, subsequently results in hazing or fogging on said inner surface of the lens, is a significant issue for the industry which needs to be addressed.

SUMMARY

The disclosure herein seeks to provide a suitable alternative condensation curable silicone based adhesive composition, which upon cure does not cause the partial or total de-activation and thereby visibly inhibit the functionality of anti-haze coatings previously applied onto the inner lens surface.

There is provided herein a two-part condensation curable lamp adhesive composition designed to adhere a front lens having an inner surface coated with an anti-haze coating to a lamp body to create a sealed lamp unit which adhesive composition comprises a base part, Part A, which comprises
 (a) a siloxane polymer having at least two hydroxyl or hydrolysable groups per molecule or a silyl modified organic polymer having at least two $(R^5)_m(Y^1)_{3-m}$—Si groups per molecule where each $R^5$ is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas;
and
 (b) a reinforcing filler
 and
a catalyst package, Part B comprising
 (i) a polydialkylsiloxane which is unreactive with polymer (a) of the base component, having the general formula:

$$R^3_3\text{—Si—O—}((R^2)_2\text{SiO})_d\text{—Si—}R^3_3 \quad (2)$$

where $R^2$ is an alkyl or phenyl group, each $R^3$ group may be the same or different and are selected from alkyl, phenyl, alkenyl or alkynyl groups having a viscosity of from about 5 to about 100,000 mPa·s at 25° C., i.e. d is an integer which provides this viscosity range;
 (ii) an optional reinforcing filler
 (iii) a tin based catalyst, and
 (iv) a cross-linker having the structure $Si(OR)_4$ where each R may be the same or different and is an alkyl group containing from 2 to 10 carbon atoms and
 (v) an adhesion promoter of the structure

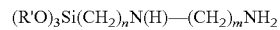

in which each R' may be the same or different and is an alkyl group containing from 1 to 10 carbon atoms, n is from 2 to 10 and m is from 2 to 10; wherein once cured in place, in use, residual ingredients from the above composition or by-products of cure reactions do not visibly inhibit functionality of said anti-haze coating.

A test method has been developed to identify suitable compositions which may be used. This test method is described herein and only compositions satisfying this test were considered to satisfy the requirement of once cured in place, in use, residual ingredients from the above composition or by-products of cure reactions do not visibly inhibit functionality of said anti-haze coating.

DETAILED DESCRIPTION

In one embodiment the catalyst package comprises cross-linker (iv), in an amount of from 1 to 30% by weight of the catalyst package, alternatively from 2 to 15% by weight of the catalyst package and/or adhesion promoter (v) in an amount of from 0.5 to 15% by weight of the catalyst package, alternatively from 2 to 8% by weight of the catalyst package.

There is also provided a lamp having a lamp body defining a lamp chamber containing a light source and having a front opening, a front lens is provided to fit and engage into the front opening, said front lens having an inner surface which further defines the lamp chamber, the inner surface being coated with an anti-haze coating characterised in that the front lens is adhered to the lamp chamber by a cured adhesive made from the composition as herein before described from which any residual components from the above composition or by-products of cure reactions do not visibly inhibit functionality of said anti-haze coating.

Furthermore, there is provided a method for making the aforementioned lamp including the steps of including the steps of providing a lamp body having a front opening and a front lens, said front lens having at least an inner surface treated with an anti-haze coating, forming a joint between the front lens into the front opening of the lamp body by engaging the front lens into the front opening of the lamp body and sealing the joint between the front lens and the lamp body with adhesive as hereinbefore described by mixing part A and part B of the composition together to form a mixture, applying the mixture onto the joint between the front lens and the lamp body and causing or allowing the composition to cure.

There is also provided herein the use of an adhesive composition as described herein as an adhesive for adhering a front lens of a lamp, treated with an anti-haze coating, to a lamp body whilst minimising or avoiding the generation of species which inhibit the function of the anti-haze coating.

The concept of "comprising" where used herein is used in its widest sense to mean and to encompass the notions of "include" and "consist of".

For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

The base component of the composition herein comprises a siloxane polymer having at least two terminal hydroxyl or hydrolysable groups per molecule as a first option as ingredient (a). Any suitable siloxane polymer having at least two terminal hydroxyl or hydrolysable groups per molecule may be provided but in one embodiment the siloxane polymer has a viscosity of from 1500 to 150000 mPa·s at 25° C., alternatively 1500 to 100,000 mPa·s at 25° C., alternatively 1500 to 80,000 mPa·s at 25° C. All viscosities mentioned were measured using a Brookfield Viscometer DV2T extra with spindle No 7 rotating at 10 rpm.

The siloxane polymer of (a) may be described by the following molecular Formula (1)

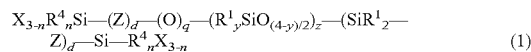

(1)

where:
n is 0, 1, 2 or 3,
d is 0 or 1, q is 0 or 1 and q+d=1
z is an integer from 300 to 5000 inclusive,
y is 0, 1 or 2, preferably 2.
At least 97% of the $R^1_y SiO_{(4-y)/2}$ are characterized with y=2.
X is a hydroxyl group or any condensable or any hydrolyzable group, and
Each Z is independently selected from an alkylene group having from 1 to 10 carbon atoms.

Each $R^4$ is individually selected from aliphatic organic groups selected from alkyl, aminoalkyl, polyaminoalkyl, epoxyalkyl or alkenyl alternatively alkyl, aminoalkyl, polyaminoalkyl, epoxyalkyl groups having, in each case, from 1 to 10 carbon atoms per group or alkenyl groups having in each case from 2 to 10 carbon atoms per group or is an aromatic aryl group, alternatively an aromatic aryl group having from 6 to 20 carbon atoms and most preferred are the methyl, ethyl, octyl, vinyl, allyl and phenyl groups.

Each $R^1$ is individually selected from the group consisting of X, alkyl groups, alternatively alkyl groups having from 1 to 10 carbon atoms, alkenyl groups alternatively alkenyl groups having from 2 to 10 carbon atoms and aromatic groups, alternatively aromatic groups having from 6 to 20 carbon atoms. Most preferred are methyl, ethyl, octyl, trifluoropropyl, vinyl and phenyl groups. It is possible that some $R^1$ groups may be siloxane branches off the polymer backbone which may have terminal groups as hereinbefore described.

Most preferred $R^1$ is methyl.

Each X group of siloxane polymer (a) may be the same or different and can be a hydroxyl group or a condensable or hydrolyzable group. The term "hydrolyzable group" means any group attached to the silicon, which is hydrolysed by water at room temperature. The hydrolyzable group X includes groups of the Formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —(CH$_2$CH$_2$O)$_2$CH$_3$; or any N,N-amino radical, such as dimethylamino, diethylamino, ethylmethylamino, diphenylamino or dicyclohexylamino.

The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

Each Z is independently selected from an alkylene group having from 1 to 10 carbon atoms. In one alternative, each Z is independently selected from an alkylene group having from 2 to 6 carbon atoms; in a further alternative each Z is independently selected from an alkylene group having from 2 to 4 carbon atoms.

The siloxane polymer (a) of the base component can be a single siloxane represented by Formula (1) or it can be mixtures of siloxanes represented by the aforesaid formula. The term "siloxane polymer mixture" in respect to component (a) of the base component is meant to include any individual siloxane polymer (a) or mixtures of siloxane polymers (a). As used herein, the term "silicone content" means the total amount of silicone used in the base component and the catalyst package, irrespective of the source, including, but not limited to the siloxane polymer (a), polymer mixtures, and/or resins.

The Degree of Polymerization (DP), (i.e. in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerization (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity. Siloxane polymer (a) is going to be present in an amount of from 20 to 80% by weight of the base composition, alternatively from 35 to 65% by weight of the base composition.

Alternatively, component (a) may be a silyl modified organic polymer having at least two $(R^5)_m(Y^1)_{3-m}$Si groups per molecule where each $R^5$ is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas.

The $(R^5)_m(Y^1)_{3-m}$—Si groups may be linked to the organic polymer backbone via any suitable linkage or may be directly bonded where appropriate. For example in the case of silyl modified polyether polymers $(R^5)_m(Y^1)_{3-m}$—Si groups may be terminal groups linked to the polyether polymer backbone via the following

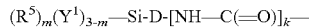

Where R, $Y^1$ and m are as hereinbefore described D is a divalent $C_{2-6}$ alkylene group, alternatively a $C_{2-4}$ alkylene group, alternatively an ethylene or propylene group and k is 1 or 0. So a silyl modified polyether might be depicted as

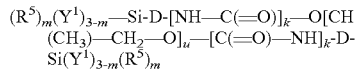

Wherein in the above example the polyether repeating group, for the sake of example, is an oxypropylene group $[CH(CH_3)-CH_2-O]$.

Each substituent $R^5$ may independently be a hydroxyl group or a hydrolysable group. The hydrolysable groups may be selected from groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, and propoxy) and alkenyloxy groups (for example isopropenyloxy and 1-ethyl-2-methylvinyloxy). However, it is preferred that each $R^5$ is an OH group or an alkoxy group having from 1 to 10 carbons, alternatively an OH group or an alkoxy group having from 1 to 6 carbons, alternatively an OH group, a methoxy group or an ethoxy group. Substituent $Y^1$ is an alkyl group containing from 1 to 8 carbons, alternatively 1 to 6 carbons, alternatively 1 to 4 carbons. Hence, when the hydrolysable group is an alkoxy group the $(R^5)_m(Y^1)_{3-m}$—Si groups may be selected from —$(Y^1)_2$SiOH$_2$, —$(Y^1)_2$SiOH, —$Y^1$Si(OR$^b$)$_2$, —Si(OR$^b$)$_3$, —$(Y^1)_2$SiOR$^b$ with Rb being an alkyl group having from 1 to 8 carbons. Typically, the silyl modified organic polymer has an organic backbone having terminal curable silyl groups.

One preferred type of polymer backbone is an acrylate polymer backbone. The acrylate polymer is an addition polymerised polymer of acrylate and/or methacrylate ester monomers, which comprise at least 50%, (i.e. from 50% to 100%) by weight of the monomer units in the acrylate polymer. Examples of acrylate ester monomers are n-butyl, isobutyl, n-propyl, ethyl, methyl, n-hexyl, n-octyl and 2-ethylhexyl acrylates. Examples of methacrylate ester monomers are n-butyl, isobutyl, methyl, n-hexyl, n-octyl, 2-ethylhexyl and lauryl methacrylates. The acrylate polymer preferably has a glass transition temperature (Tg) below ambient temperature; acrylate polymers are generally preferred over methacrylates since they form lower Tg polymers. Polybutyl acrylate is particularly preferred. The acrylate polymer can contain lesser amounts of other monomers such as styrene, acrylonitrile or acrylamide. The acrylate(s) can be polymerized by various methods such as conventional radical polymerization, or living radical polymerization such as atom transfer radical polymerization, reversible addition—fragmentation chain transfer polymerization, or anionic polymerization including living anionic polymerisation.

In one alternative the alkoxy silyl terminated organic polymer is a polyether as previously described. Whereas the polymer backbone is exemplified in the structure above as $[CH(CH_3)-CH_2-O]_u$ such polyethers may comprise a variety of recurring oxyalkylene units, illustrated by the average formula $(-C_pH_{2p}-O-)_y$, wherein p is an integer from 2 to 4 inclusive and y is an integer ≥4 i.e. of at least four. The number average molecular weight (Mn) of each polyether may range from about 300 to about 10,000 which may be determined by way of ASTM D5296-05 and calculated as polystyrene molecular weight equivalents. Moreover, the oxyalkylene units are not necessarily identical throughout the polyoxyalkylene, but can differ from unit to unit. A polyoxyalkylene, for example, can comprise oxyethylene units ($-C_2H_4-O-$), oxypropylene units ($-C_3H_6-O-$) or oxybutylene units ($-C_4H_8-O-$), or mixtures thereof. Preferably the polyoxyalkylene polymeric backbone consists essentially of oxyethylene units or oxypropylene units. Other polyoxyalkylenes may include for example: units of the structure:

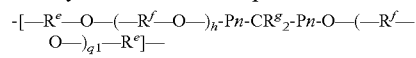

in which Pn is a 1,4-phenylene group, each $R^e$ is the same or different and is a divalent hydrocarbon group having 2 to 8 carbon atoms, each $R^f$ is the same or different and is an ethylene group or propylene group, each $R^g$ is the same or different and is a hydrogen atom or methyl group and each of the subscripts h and q1 is a positive integer in the range from 3 to 30.

One preferred type of polyether is a polyoxyalkylene polymer comprising recurring oxyalkylene units of the formula ($-C_pH_{2p}-O-$) wherein p is an integer from 2 to 4 inclusive. Polyoxyalkylenes usually have terminal hydroxyl groups and can readily be modified with moisture curable silyl groups, for example by reaction with an excess of an alkyltrialkoxysilane to introduce terminal alkyldialkoxysilyl groups as previously discussed. Alternatively polymerization may occur via a hydrosilylation type process. Polyoxyalkylenes consisting wholly or mainly of oxypropylene units have properties suitable for many adhesion uses.

Examples of silyl modified hydrocarbon polymers include silyl modified polyisobutylene. Silyl modified polyisobutylene can for example contain curable silyl groups derived from a silyl-substituted alkyl acrylate or methacrylate monomer such as alkoxydialkylsilylpropyl methacrylate, dialkoxyalkylsilylpropyl methacrylate or trialkoxysilylpropyl methacrylate, which can be reacted with a polyisobutylene.

The preferred polymer (a) is the siloxane polymer.

The base component reinforcing filler (b) may contain one or more finely divided, reinforcing fillers such as precipitated calcium carbonate, fumed silica and/or precipitated silica including, for example, rice hull ash. Typically, the surface area of the reinforcing filler (b) is at least 15 m$^2$/g in the case of precipitated calcium carbonate measured in accordance with the BET method in accordance with ISO 9277: 2010, alternatively 15 to 50 m$^2$/g, alternatively 15 to 25 m$^2$/g in the case of precipitated calcium carbonate. Silica reinforcing fillers have a typical surface area of at least 50 m$^2$/g. In one embodiment reinforcing filler (b) is a precipitated calcium carbonate, precipitated silica and/or fumed silica; alternatively precipitated calcium carbonate. In the case of high surface area fumed silica and/or high surface area precipitated silica, these may have surface areas of from 100 to 400 m$^2$/g measured in accordance with the BET method in accordance with ISO 9277: 2010, alternatively of from 100 to 300 m$^2$/g in accordance with the BET method in accordance with ISO 9277: 2010, may be chosen for use. Typically, the reinforcing fillers are present in the base composition in an amount of from 20 to 70% by weight of the base composition, alternatively from 35 to 65% by weight of the base composition, alternatively from 40 to 60% by weight of the base composition.

Reinforcing filler (b) may be hydrophobically treated for example with a fatty acid e.g. stearic acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other adhesive components The surface treatment of the fillers makes them easily wetted by polymer (a) of the base component. These surface modified fillers do not clump, and can be homogeneously incorporated into the silicone polymer (i) of the base component. This results in improved room temperature mechanical properties of the uncured compositions. The fillers may be pre-treated or may be treated in situ when being mixed with polymer (a).

As hereinbefore described the catalyst package of the two component composition comprises polydialkylsiloxane (i) which is unreactive with any reactive polymer in the base component (i.e. polymer (a) discussed above). Polydialkylsiloxane (i) may have the general formula

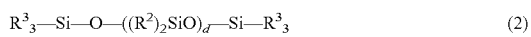

where each $R^2$ may be the same or different and is an alkyl or phenyl group, alternatively a $C_{1-10}$ alkyl group, alternatively a $C_{1-6}$ alkyl group, alternatively a methyl or ethyl group; each $R^3$ group may be the same or different and is selected from $R^2$ above or an alkenyl or alkynyl group. Typically, polydialkylsiloxane (i) has a viscosity of from about 5 to about 100,000 mPa·s at 25° C., with d being an integer resulting in a polydialkylsiloxane within the specified viscosity range. Typically these are polydimethylsiloxanes which are unreactive with the siloxane polymer of the composition, such as polydimethylsiloxane in which each $R^2$ is a methyl group and each $R^3$ group may be the same or different and is, for example, an alkyl group having from 1 to 6 carbons, an alkenyl group, an alkynyl group or a phenyl group alternatively $R^3$ groups are selected from alkyl groups having from 1 to 6 carbons, such as methyl, ethyl, propyl, n-butyl, t-butyl, pentyl and/or hexyl or phenyl groups, alternatively methyl or ethyl groups. Typically, polydialkylsiloxane (i) is linear but it may contain a degree of branching. Polydialkylsiloxane (i), which is unreactive with polymer (a), is typically present in the catalyst package as a carrier and is present in an amount of from 30 to 70.5 weight %, alternatively 45 to 70.5 weight % of the catalyst package; alternatively 55 to 70.5 weight % of the catalyst package.

The catalyst component may also comprise one or more reinforcing fillers (ii). When present they may contain one or more finely divided, reinforcing fillers such as high surface area fumed silica and/or high surface area precipitated silica including, for example, rice hull ash or precipitated calcium carbonate. In one alternative when present the reinforcing filler (ii) is a fumed silica. Typically, the surface area of the reinforcing filler (b) is at least 50 m$^2$/g. In the case of high surface area fumed silica and/or high surface area precipitated silica, these may have surface areas of from 100 to 400 m$^2$/g measured using the BET method in accordance with ISO 9277: 2010, alternatively of from 100 to 300 m$^2$/g using the BET method in accordance with ISO 9277: 2010, may be chosen for use. Typically, the reinforcing fillers are optional and the amount present in the catalyst part may range from 0 to 10% by weight of the catalyst part, alternatively when present from 0.5 to 7.5% by weight of the catalyst part, alternatively when present from 0.5 to 5% by weight of the catalyst part.

When present, reinforcing filler (ii) may be hydrophobically treated for example with a fatty acid e.g. stearic acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other adhesive components The surface treatment of the fillers makes them easily wetted by polymer (a) of the base component. These surface modified fillers do not clump, and can be homogeneously incorporated into the silicone polymer (i) of the base component. This results in improved room temperature mechanical properties of the uncured compositions. The fillers may be pre-treated or may be treated in situ when being mixed with polymer (a).

The catalyst part may also comprise a suitable tin based condensation catalyst (iii) which is for use as the catalyst for the cure reaction subsequent to mixing the base component and catalyst package component together. Examples include tin triflates, organic tin metal catalysts such as triethyltin tartrate, tin octoate, tin oleate, tin naphthate, butyltintri-2-ethylhexoate, tin butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodecanoate (DMTDN) and dibutyltin dioctoate. The tin catalyst may be present in an amount of from 0.01 to 3 weight %; alternatively 0.1 to 0.75 weight % of the catalyst package.

The catalyst package also contains a cross-linker (iv) having the structure Si(OR)$_4$ where each R may be the same or different and is an alkyl group containing from 2 to 10 carbon atoms, alternatively from 2 to 6 carbon atoms, alternatively from 2 to 4 carbon atoms. Whilst each R group may be the same of different it is preferred that at least two R groups are the same, alternatively at least three R groups are the same and alternatively all R groups are the same. When two, three or all R groups are the same and have 2 to 6 carbon atoms, alternatively 2 to 4 carbon atoms. Specific examples of cross-linker (iv) include tetraethylorthosilicate, tetrapropylorthosilicate, tetra(n-)butylorthosilicate and tetra (t-) butylorthosilicate.

The amount of crosslinker present in the composition will depend upon the particular nature of the crosslinker and in particular, the molecular weight of the molecule selected. The compositions suitably contain crosslinker in at least a stoichiometric amount as compared to polymer (a) of the base part above. Compositions may contain, for example, cross-linker in an amount of from 2-30% by weight of the catalyst composition, but generally from 2 to 15% by weight of the catalyst composition, alternatively from 4 to 11% by weight of the catalyst composition.

The catalyst package also contains an adhesion promoter (v) of the structure

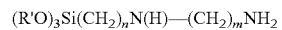

in which each R' may be the same or different and is an alkyl group containing from 1 to 10 carbon atoms, n is from 2 to 10 and m is from 2 to 10. Each R' may be the same or different and is an alkyl group containing from 1 to 10 carbon atoms, alternatively an alkyl group containing from 1 to 6 carbon atoms, alternatively from 1 to 4 carbon atoms, alternatively is a methyl or ethyl group. In one alternative at least two R' groups are the same, alternatively all R' groups are the same. When at least two R' groups alternatively all R' groups are the same, it is preferred if they are methyl or ethyl groups. In adhesion promoter (v) there may be n —CH$_2$— groups where n is from 2 to 10, in one alterative n may be from 2 to 6, in another alternative n may be from 2 to 5, in a still further alternative n may be 2 or 3, alternatively n is 3. In adhesion promoter (iv) there may be m —CH$_2$— groups where m is from 2 to 10, in one alterative m may be from 2 to 6, in another alternative m may be from 2 to 5, in a still further alternative m may be 2 or 3, alternatively m is 2. Specific examples of adhesion promoter (v) include but are not limited to (ethylenediaminepropyl) trimethoxysilane and (ethylenediaminepropyl) triethoxysilane. In one alternative the adhesion promoter (v) is present in an amount of from 1 to 10% by weight of the catalyst composition, alternatively from 2 to 8% by weight of the catalyst composition, alternatively from 2 to 6% by weight of the catalyst composition.

In one alternative the weight ratio of (iv):(v) in Part B is greater than 1.5:1, alternatively from 1.5 to 2:1.

Optionally, the catalyst package may also include one or more of, pigments and/or non-reinforcing fillers.

Pigments are utilized to color the composition as required. Any suitable pigment may be utilized providing it is compatible with the composition. In two-part compositions pigments and/or colored (non-white) fillers, e.g. carbon black may be utilized in the catalyst package to color the end adhesive product. When present carbon black will function as both a non-reinforcing filler and colorant and is present in a range of from 1 to 30% by weight of the catalyst package composition, alternatively from 1 to 20% by weight of the catalyst package composition; alternatively from 5 to 20% by weight of the catalyst package composition, alternatively from 7.5 to 20% by weight of the catalyst composition.

Additional non-reinforcing fillers such as crushed quartz, diatomaceous earths, barium sulphate, iron oxide, titanium dioxide and carbon black, talc, wollastonite may be present in the composition. Other non-reinforcing fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3 \cdot 2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

The non-reinforcing fillers may also be surface treated to be rendered hydrophobic using analogous treating agents as discussed for the reinforcing fillers above.

Other additives may be used if necessary. These may include rheology modifiers, heat stabilizers, flame retardants, UV stabilizers, cure modifiers, electrically conductive fillers, heat conductive fillers, and fungicides and/or biocides and the like; co-catalysts for accelerating the cure of the composition such as metal salts of carboxylic acids and amines; Heat stabilizers, Flame retardants, UV stabilizers, Chain extenders, electrically and/or heat conductive fillers, Fungicides and/or biocides and the like water scavengers, (typically the same compounds as those used as cross-linkers or silazanes). It will be appreciated that some of the additives are included in more than one list of additives. Such additives would then have the ability to function in all the different ways referred to.

Rheology modifiers which may be incorporated in moisture curable compositions according to the invention include silicone organic co-polymers such as those described in EP0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion to substrates, particularly plastic substrates.

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole.

The fungicide and/or biocide may suitably be present in an amount of from 0 to 0.3% by weight of the composition and may be present in an encapsulated form where required such as described in EP2106418.

Plasticisers may be utilised, particularly in silyl modified organic polymer based compositions. Given the fact that the polymer backbone is substantially organic (i.e. not containing Si—O—Si bonds in the polymer backbone) the plasticisers are generally selected from those which are suitable for plasticizing the polymer(s), if deemed necessary. Examples include hydroxyl terminated polypropylene ethers, hydroxyl terminated polyethylene ethers, hydroxyl terminated polypropylene/polyethylene ether co-polymers. Alkoxy terminated polypropylene ethers, alkoxy terminated polyethylene ethers, alkoxy terminated polypropylene/polyethylene ether co-polymers. Commercially hydroxyl terminated polypropylene ethers are sold under the VORANOL Trade Mark by the Dow Chemical Company. Indeed if appropriate consideration may be given for replacing component (i) of part B as described above with one of these plasticisers if component (a) of part A is an SMP polymer.

Heat stabilizers may include Examples of heat stabilizers include metal compounds such as red iron oxide, yellow iron oxide, ferric hydroxide, cerium oxide, cerium hydroxide, lanthanum oxide, copper phthocyanine, aluminium hydroxide, fumed titanium dioxide, iron naphthenate, cerium naphthenate, cerium dimethylpolysilanolate and acetylacetone salts of a metal chosen from copper, zinc, aluminum, iron, cerium, zirconium, titanium and the like.

Flame retardants may include for example, carbon black, hydrated aluminium hydroxide, and silicates such as wollastonite, platinum and platinum compounds.

Chain extenders may include difunctional silanes which extend the length of the polysiloxane polymer chains before crosslinking occurs and, thereby, reduce the modulus of elongation of the cured elastomer. Chain extenders and crosslinkers compete in their reactions with the functional polymer ends; in order to achieve noticeable chain extension, the difunctional silane must have substantially higher reactivity than the typical trifunctional cross-linker. Suitable chain extenders for condensation cure systems are, for example, Diacetamideosilanes such as dialkyldiacetamidosilanes or alkenylalkyldiacetamidosilanes, particularly methylvinyldi-di(N-methylacetamido)silane diacetoxysilanes, such as dialkyldiacetoxysilanes and alkylalkenyldiacetoxysilanes diaminosilanes, such as dialkyldiaminosilanes or alkylalkenyldiaminosilanes particularly those where each amino group has one Si—N bond and two N—C bonds;
dialkoxysilanes such as
dialkoxysiloxanes (having from 2 to 25 Si—O linkages), diamidosilanes such as dialkyldiamidosilanes or alkylalkenyldiamidosilanes hexaorganodisilazanes (wherein the organo groups are each independently alkyl groups having 1 to 6 carbon atoms or alkenyl groups having 1 to 6 carbon atoms) diketoximinosilanes such as dialkylkdiketoximinosilanes and alkylalkenyldiketoximinosilanes
α-aminoalkyldialkoxyalkylsilanes wherein the alkyl and alkoxy groups contain from 1 to 5 carbon atoms, such as α-aminomethyldialkoxymethylsilanes particularly preferred are those where the aminomethyl group is an N,N-dialkylaminomethyl group.

Specific examples of chain extenders include alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, and alkenylalkyldihydroxysilanes such as vinyl methyl dihydroxysilane, vinyl ethyldihydroxysilane, vinyl methyldihydroxysilane, vinylethyldihydroxysilane. methylphenyl-dimethoxysilane, di-butoxy diacetoxysilane, Alkylalkenylbis(N-alkylacetamido) silanes such as methylvinyldi-(N-methylacetamido)silane, and methylvinyldi-(N-ethylacetamido)silane; dialkylbis(N-arylacetamido) silanes such as dimethyldi-(N-methylacetamido)silane; and dimethyldi-(N-ethylacetamido)silane; Alkylalkenylbis(N-arylacetamido) silanes such as methylvinyldi(N-phenylacetamido)silane and dialkylbis(N-arylacetamido) silanes such as dimethyldi-(N-phenylacetamido)silane, methylvinyl bis(N-methylacetamido)silane, methylhydrogendiacetoxysilane, dimethylbis (N-diethylaminoxy)silane and dimethylbis(sec.-butylamino) silane. The chain extender used may also comprise any combination of two or more of the above.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

When part A and part B are mixed the total composition as well as having the ability, once cured in place and in use, not to visibly inhibit functionality of said anti-haze coating, the resulting adhesive preferably has a tack free time (TFT) of less than 60 minutes, alternatively less than 40 minutes following the process described in ASTM 2377-94 using a polyethylene film.

For the avoidance of doubt, the TFT of an adhesive or sealant or the like is the time when an adhesive or sealant reaches a state of sufficient resistance to damage during the cure process to damage by contact or handling, i.e. when the adhesive/sealant has formed a tack free surface at the adhesive and air interface such that when a film is placed on the adhesive/sealant at the air the adhesive/sealant is no longer tacky (sticky) to the touch. The tack free time period of the final composition needs to of sufficient duration to enable the, in this instance, adhesive to be applied and worked into a desired shape and position relative to the materials being adhered together but in an industrial situation needs to be quick enough to avoid too great a delay whilst the cure process takes place. A coating's tack-free time is important to note as it assists in scheduling and processing the manufactured products being produced e.g. in this case lamps or the like with the adhesive cure process being one step in the manufacturing process to maintain output efficiency.

Hence there may also be provided herein a two-part condensation curable adhesive composition comprising a base part, Part A, which comprises
(a) a siloxane polymer having at least two hydroxyl or hydrolysable groups per molecule or a silyl modified organic polymer having at least two $(R^5)_m(Y^1)_{3-m}$—Si groups per molecule where each $R^5$ is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas;
and
(b) a reinforcing filler
and
a catalyst package, Part B comprising
(i) a polydialkylsiloxane which is unreactive with polymer (a) of the base component, having the general formula:

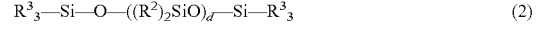
$$R^3{}_3\text{—Si—O—}((R^2)_2\text{SiO})_d\text{—Si—}R^3{}_3 \qquad (2)$$

where $R^2$ is an alkyl or phenyl group, each $R^3$ group may be the same or different and are selected from alkyl, phenyl, alkenyl or alkynyl groups having a viscosity of from about 5 to about 100,000 mPa·s at 25° C., i.e. d is an integer which provides this viscosity range;
(ii) an optional reinforcing filler
(iii) a tin based catalyst, and
(iv) a cross-linker having the structure $Si(OR)_4$ where each R may be the same or different and is an alkyl group containing from 2 to 10 carbon atoms and
(v) an adhesion promoter of the structure

$$(R'O)_3Si(CH_2)_nN(H)\text{—}(CH_2)_mNH_2$$

in which each R' may be the same or different and is an alkyl group containing from 1 to 10 carbon atoms, n is from 2 to 10 and m is from 2 to 10; and optionally wherein the weight ratio of (iv):(v) in Part B is at least 1.5:1 alternatively from 1.5:1 to 2:1 and/or wherein once part A and part B are combined the combined composition has a tack free time of less than 60 minutes, alternatively less than 40 minutes in accordance with ASTM 2377-94. A polyethylene film being used for determining the tack free time.

Preferably such a composition is a two-part condensation curable lamp adhesive composition designed to adhere a front lens having an inner surface coated with an anti-haze coating to a lamp body to create a sealed lamp unit wherein once cured in place, in use, residual ingredients from the above composition or by-products of cure reactions do not visibly inhibit functionality of said anti-haze coating. This may be determined by utilisation of the test method developed and described in the examples herein.

When Part A and Part B are mixed in e.g. a 10:1 ratio the total composition of the base component and the catalyst package comprises (based on % by weight of the total combined composition) approximately 18 to 72 weight %, alternatively 35 to 67% by weight of polymer (a);
18 to 63 weight %, alternatively 25 to 50% by weight of reinforcing fillers (b);
3 to 7 weight % of polydialkylsiloxane (i), which is unreactive with polymer (a);
0 to 10 weight % of optional reinforcing filler (ii), which may or may not be the same as (b) in the base part;
0.01 to 1 weight % of tin based catalyst (iii);
0.1 to 3 weight % of cross-linker (iv); and
0.1 to 1.5 weight % of adhesion promoter (v);
and from 0 to 15% by weight, alternatively from 0.1 to 7.5% by weight of pigment/non-reinforcing filler; and
If required other optional ingredients
with the total weight % of the combined composition being 100 weight % and optionally the weight ratio of (iv):(v) in Part B is at least 1.5:1, alternatively from 1.5:1 to 2:1.

In the case of 2 part compositions, the base component comprises:
20 to 80 weight %, alternatively from 35 to 65% by weight of polymer (a); and
20 to 80 weight %, alternatively from 35 to 65% by weight of reinforcing fillers (b); with the total weight % of the base component being 100 weight %.

The catalyst package composition comprises:
30 to 70.5 weight % of polydialkylsiloxane (i), which is unreactive with polymer (a), alternatively 45 to 70.5 weight %, alternatively from 55 to 70.5 weight % of polydialkylsiloxane (i), which is unreactive with polymer (a);
0 to 10 weight % of optional reinforcing filler (ii), which may or may not be the same as (b) in the base part;
0.01 to 3 weight % of tin based catalyst (iii), alternatively 0.1 to 1.5 weight % of tin based catalyst (iii);
1 to 30 weight % of cross-linker (iv), alternatively 2 to 15 weight %; and
1.0 to 10 weight %, alternatively from 2 to 8 weight % of adhesion promoter (v);
0 to 30 weight % colored filler (e.g. carbon black) or pigment, typically 1 to 20 weight % by weight when present; all relative to the total weight of the catalyst package composition.

with the total weight % of the catalyst package 100 weight % and optionally with the weight ratio of (iv):(v) in Part B being at least 1.5:1, alternatively of from 1.5:1 to 2:1.

Hence, the catalyst package, Part B of the composition may comprise 30 to 70.5 weight % of polydialkylsiloxane (i), which is unreactive with polymer (a), alternatively 45 to 70.50 weight %, alternatively from 55 to 70.50 weight % of polydialkylsiloxane (i), which is unreactive with polymer (a) in combination the weight ratio of (iv):(v) in Part B being at least 1.5:1, alternatively from 1.5:1 to 2:1.

In one alternative in addition to the latter the composition may comprise from 1 to 20% by weight of the hereinbefore mentioned non-reinforcing filler and/or pigment. For the avoidance of doubt the non-reinforcing filler and pigment may be one and the same such as when it is carbon black which can be utilised if the end user requires a black or gray sealant for the lamp adhesive.

Preferably in each of the above the polymer (a) is a siloxane polymer.

In the case of 2 part adhesive compositions, the components of each part are mixed together in amounts within the ranges given above and then the base component composition and the catalyst package composition are inter-mixed in a predetermined ratio e.g. from 15:1 to 1:1, alternatively from 15:1 to 5:1; alternatively from 7:1 to 12:1 when the two parts are mixed together. If the intended mixing ratio of the base component:catalyst package is 15:1 or greater then no filler will be generally utilized in the catalyst package. However if the intended mixing ratio of the base component: catalyst package is less than 15:1 an increasing amount filler will be utilized in the catalyst package up to the maximum of 50 weight % of the catalyst package, if the intended ratio is 1:1. The moisture curable compositions can be prepared by mixing the ingredients employing any suitable mixing equipment.

The compositions are preferably room temperature vulcanisable compositions in that they cure at room temperature without heating.

The compositions can be prepared by mixing the ingredients employing any suitable mixing equipment. Other components may be added as necessary.

After mixing, the compositions may be stored under substantially anhydrous conditions, for example in sealed containers, until required for use.

There is also provided a lamp having a lamp body defining a lamp chamber containing a light source and having a front opening, a front lens is provided to engage into the front opening, said front lens having an inner surface which further defines the lamp chamber, the inner surface being coated with an anti-haze coating characterised in that the front lens is adhered to the lamp chamber by a cured adhesive made from a two-part condensation curable adhesive composition comprising a first part, Part A, which comprises (a) a siloxane polymer having at least two hydroxyl or hydrolysable groups per molecule; in one alternative having a viscosity of from 1500 to 150000 mPa·s at 25° C. or a silyl modified organic polymer having at least two $(R^5)_m(Y^1)_{3-m}$—Si groups per molecule where each $R^5$ is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas; and (b) a reinforcing filler; in one alternative, calcium carbonate, and a second part, Part B comprising
a polydialkylsiloxane which is unreactive with polymer
(a) of the base component, having the general formula:

$$R^3{}_3—Si—O—((R^2)_2SiO)_d—Si—R^3{}_3 \quad (2)$$

where $R^2$ is an alkyl or phenyl group, each $R^3$ group may be the same or different and are selected from alkyl, phenyl, alkenyl or alkynyl groups having a viscosity of from about 5 to about 100,000 mPa·s at 25° C., i.e. d is an integer which provides this viscosity range;
(ii) an optional reinforcing filler
(iii) a tin based catalyst, and
(iv) a cross-linker having the structure $Si(OR)_4$ where each R may be the same or different and is an alkyl group containing from 2 to 10 carbon atoms and
(v) an adhesion promoter of the structure $$(R'O)_3Si(CH_2)_nN(H)—(CH_2)_mNH_2$$

in which each R' may be the same or different and is an alkyl group containing from 1 to 10 carbon atoms, n is from 2 to 10 and m is from 2 to 10 wherein once cured in place, in use, residual ingredients from the above composition or by-products of cure reactions do not visibly inhibit functionality of said anti-haze coating.

The composition is a two-part condensation curable lamp adhesive composition designed to adhere said front lens having an inner surface coated with an anti-haze coating to a lamp body to create a sealed lamp unit wherein once cured in place, in use, residual ingredients from the above composition or by-products of cure reactions do not visibly inhibit functionality of said anti-haze coating. This may be determined by utilisation of the test method developed and described in the examples herein.

In one alternative the adhesive used to adhere the front lens to the lamp chamber as described above has a weight ratio of (iv):(v) in Part B of at least 1.5:1, alternatively from 1.5:1 to 2:1 and/or once part A and part B are combined the combined composition has a tack free time of less than 60 minutes, alternatively less than 40 minutes using the process described in ASTM 2377-94 using a polyethylene film.

In one embodiment the catalyst package comprises cross-linker (iv), in an amount of from 1 to 30% by weight of the catalyst package, alternatively from 2 to 15% by weight of the catalyst package and/or adhesion promoter (v) in an amount of from 1.0 to 10% by weight of the catalyst package, alternatively from 2 to 8% by weight of the catalyst package.

The lamp body may be made of any suitable material such as Polybutylene terephthalate (PBT), Cast Aluminum, Acrylonitrile butadiene styrene (ABS), polypropylene (PP), ethylene propylene diene monomer rubber (EPDM), Polyphenylene sulfide (PPS), Polyether ether ketone (PEEK), low density polyethylene (LDPE), high density polyethylene (HDPE), polyamide (PA), Acrylic-styrene-acrylonitrile (ASA), Polyether ether ketone (PEEK) and composites thereof. PBT-GF30 (a polybutylene terephthalate that contains fibreglass), TV40+PP and TV20/GF10, PBT-MF30, blend of Polybutylene Terephthalate and Acrylonitrile Styrene Acrylate (PBT/ASA) and PP+GF20 (glass fibre reinforced PP).

The front lens may be made of any suitable material, specific examples include but are not limited to polycarbonate or PMMA or the like.

The outer surface of the lens may be treated with a scratch resistant coating.

There is also provided a method for making the aforementioned lamp including the steps of providing a lamp body having a front opening and a front lens, said front lens having at least an inner surface treated with an anti-haze coating, forming a joint between the front lens into the front opening of the lamp body by engaging the front lens into the front opening of the lamp body and sealing the joint between the front lens and the lamp body with an adhesive as hereinbefore described by mixing part A and part B of the adhesive composition together to form a mixture, applying the mixture onto the joint between the front lens and the lamp body and causing or allowing the composition to cure; wherein said adhesive is a two-part condensation curable silicone based adhesive composition comprising
a first part, Part A, which comprises
(a) a siloxane polymer having at least two hydroxyl or hydrolysable groups per molecule; in one alternative having a viscosity of from 1500 to 150000 mPa·s at 25° C. or a silyl modified organic polymer having at least two $(R^5)_m(Y^1)_{3-m}$—Si groups per molecule where each $R^5$ is hydroxyl or a hydrolysable group, each $Y^1$ is an alkyl group containing from 1 to 8 carbons and m is 1, 2 or 3, which organic polymer is selected from polyethers, hydrocarbon polymers, acrylate polymers, polyesters, polyurethanes and polyureas; and
(b) a reinforcing filler; in one alternative, calcium carbonate, and
a second part, Part B comprising
(i) a polydialkylsiloxane which is unreactive with polymer (a) of the base component, having the general formula:

$$R^3{}_3—Si—O—((R^2)_2SiO)_d—Si—R^3{}_3 \quad (2)$$

where $R^2$ is an alkyl or phenyl group, each $R^3$ group may be the same or different and are selected from alkyl, phenyl, alkenyl or alkynyl groups having a viscosity of from about 5 to about 100,000 mPa·s at 25° C., i.e. d is an integer which provides this viscosity range;
(ii) an optional reinforcing filler
(iii) a tin based catalyst, and
(iv) a cross-linker having the structure $Si(OR)_4$ where each R may be the same or different and is an alkyl group containing from 2 to 10 carbon atoms and
(v) an adhesion promoter of the structure $$(R'O)_3Si(CH_2)_nN(H)—(CH_2)_mNH_2$$

in which each R' may be the same or different and is an alkyl group containing from 1 to 10 carbon atoms, n is from 2 to 10 and m is from 2 to 10.

The composition is a two-part condensation curable lamp adhesive composition designed to adhere said front lens having an inner surface coated with an anti-haze coating to a lamp body to create a sealed lamp unit wherein once cured in place, in use, residual ingredients from the above composition or by-products of cure reactions do not visibly inhibit functionality of said anti-haze coating. This may be determined by utilisation of the test method developed and described in the examples herein.

In one alternative the adhesive used to adhere the front lens to the lamp chamber as described above has a weight ratio of (iv):(v) in Part B of at least 1.5:1, alternatively from 1.5:1 to 2:1 and/or once part A and part B are combined the combined composition has a tack free time of less than 60 minutes, alternatively less than 40 minutes using the process described in ASTM 2377-94 using a polyethylene film.

In one embodiment the catalyst package comprises cross-linker (iv), in an amount of from 1 to 30% by weight of the catalyst package, alternatively from 2 to 15% by weight of the catalyst package and/or adhesion promoter (v) in an amount of from 1.0 to 10% by weight of the catalyst package, alternatively from 2 to 8% by weight of the catalyst package.

The process may involve fitting and engaging a lamp lens into a front opening of a lamp chamber; mixing the part A and part B compositions in a pre-determined ratio e.g. part A:Part B being 10:1. The resulting adhesive composition can then be applied onto the space/join between said front lens engaged in the front opening of the lamp chamber and the lamp chamber and causing or allowing the composition to cure thereby sealing said join between the front lens and the lamp chamber. If necessary or desired the regions of the lamp body and lens which are to be adhered together by the adhesive may be pre-treated to enhance the adhesion. This may be by application of a primer or other pre-treatment agent or by plasma or corona treatment or the like of the areas to be adhered using the aforementioned adhesive.

The process may also include a step of applying a coating of an anti-haze coating composition onto at least one surface of the front lens, i.e. the inner surface. The coating is applied so as to have a thickness, when dry/cured of between 1 to 100 μm.

The composition as described herein is desirable for the present process as no or minimal haze is observed on the front lens inner surface after cure of the adhesive and as such it can be appreciated that ingredients from the adhesive are not negatively interacting with the previously applied anti-haze coating and as such effectively maintaining the integrity of the anti-haze coating and avoiding impairment of the visibility of the light being shone from the lamp retained in the lamp. This may be determined by utilisation of the test method developed and described in the examples herein.

Adhesives as described above may be utilised in a variety of applications, for example outdoor lighting, decorative lighting, vehicle lamps e.g. for automobile, truck, motorcycle and boat lamps, as well as other vehicle lamps, lighting applications and indeed any other applications requiring a condensation cure adhesive with by-products having a low-volatile content, e.g. for sealing housings/boxes of electronic components. Vehicle lamps may include for the sake of example head lamps, brake lamps, running lamps, turn signal lamps, fog lamps, back-up lamps and parking lamps.

EXAMPLES

All viscosities mentioned were measured at 25° C. using a Brookfield Viscometer Type DV2T extra with spindle No. 7 rotating at 10 rpm.

In the following examples a standard base material was used for all examples. This was of the formula depicted in Table 1 below:

TABLE 1

Base Composition

| Base Ingredient | Weight % of Base |
|---|---|
| Dimethyl hydroxy terminated polydimethylsiloxane, viscosity 16,500 mPa · s at 25° C. | 57.8 |
| Calcium Carbonate | 40.8 |
| Titanium dioxide | 1.4 |

The calcium carbonate used was stearic acid treated commercially available calcium carbonate sold under the name Calofort® S from Specialty Minerals Inc.

A series of comparatives and examples of the part B catalyst package composition were produced as indicated in Tables 2 and 4 below and these were mixed with samples of the base composition depicted in Table 1 above in a Base:Catalyst package ratio of 10:1 and the resulting compositions were cured and analysed for their properties. The latter are depicted in Tables 3 and 5 below. The treated silica used in the catalyst package examples was AEROSIL® 974 from Evonik. Comparative catalyst package 1 uses ingredients often used in current adhesive formulations for lamp adhesives.

TABLE 2

Comparative Part B catalyst compositions

| Ingredients | Comp. 1 (wt. %) | Comp. 2 (wt. %) | Comp. 3 (wt. %) | Comp. 4 (wt. %) |
|---|---|---|---|---|
| Trimethylsilyl terminated polydimethylsiloxane 60,000 mPa · s | 56.89 | 70.33 | 73.87 | 71.97 |
| Carbon black | 12.99 | 16.06 | 16.87 | 16.44 |
| Treated silica | 0.65 | 0.8 | 0.84 | 0.82 |
| DMDTN catalyst | 0.23 | 0.46 | 0.65 | 0.65 |
| reaction product of aminopropyltrimethoxysilane with glycidoxypropyltrimethoxysilane and methyltrimethoxysilane | 25.064 | | | |
| methyltrimethoxysilane | 4.18 | | | |
| Gamma aminopropyltriethoxysilane | | 4.68 | | |
| Tetraethylorthosilicate (iv) | | 7.67 | 5.44 | 6.568 |
| Ethylenediaminepropyltrimethoxysilane (v) | | | 2.33 | 3.56 |
| Weight ratio of (iv):(v) | | | 2.33:1 | 1.84:1 |
| Mix ratio of Part A:Part B (parts by weight) | 100:14 | 100:9.5 | 100:9.51 | 100:9.75 |

For the avoidance of doubt Mix ratio of Part A:Part B is in parts by weight. Hence, when the ratio is indicated to be 100:14, this might be interpreted to mean 100 g by weight of component A and 14 g by weight of Part B. The Ethylenediaminepropyltrimethoxysilane used in the examples is commercially available under the XIAMETER® OFS-6020 Silane name from Dow Silicones Corporation. The above compositions were assessed for their physical properties as depicted in Table 3 below. A test was developed to measure the effect of the by-products and volatiles from the adhesive compositions in an enclosed space on anti-haze coatings. Substrates were coated with two commercial anti-haze coatings, referred to hereafter as Commercial AHC 1 and Commercial AHC 2. The test protocol is described below and was used for all examples and comparative examples.

Antihaze coating (AHC) compatibility Test Method—to determine the compatibility of a silicone adhesive to two commercial anti-haze Coatings (AHCs).

To determine if the adhesive composition being used was a satisfactory lamp adhesive composition able to adhere said front lens having an inner surface coated with an anti-haze coating to a lamp body to create a sealed lamp unit (either with or without pre-treatment) and to ensure that once cured in place, in use, residual ingredients from the above composition or by-products of cure reactions did not visibly inhibit functionality of said anti-haze coating the following anti-haze coating compatibility test was developed. For the avoidance of doubt compatibility with respect to this test was intended to mean the determination as to whether or not the water-film-forming-effect intended by the provision of the AHC on an internal closed surface is changed by the by-products and residual cross-linker materials from the silicone adhesive.

The adhesive under test typically a silicone based material, was first prepared by mixing part A and part B in a ratio of part A:part B of 10:1, using a Hauschild-Mixer Type AM 501 (Hauschild & Co. KG, Germany). Once mixed approximately 1.0 g of the resulting uncured adhesive product was placed on the bottom of an Alu-Cup (Alu-Kappen Art.-Nr. 3621313 (32×30 mm), from SCHUETT-BIOTEC GMBH (hereafter referred to as "Alu-Cup"). The open end of the Alu-cup was then covered and closed by placing a polycarbonate (PC) plate, which had been previously coated with an anti-haze coating thereon, ensuring full closure. The PC plate was fixed in place ensuring that the Silicone Adhesive and the AHC share the same atmosphere for a typical cure time of the Silicone Adhesive. The Alu-Cups were then left for a 7 day period to allow the adhesive to thoroughly cure. It is to be understood that during the cure process, given it is by way of a condensation cure process by-products and residual cross-linker will evaporate into the atmosphere within the cup and may contaminate and effect the AHC on the inner facing surface of the polycarbonate strip.

After the 7 day cure period, a 2nd Alu-Cup, was filled with water and heated on a laboratory hotplate up to 75° C. The PC plate was then removed from the original Alu-Cup and placed onto the opening of the second Alu-Cup with the AHC coating facing the water therein. The interaction between the hot water and the AHC coated surface was then observed to determine the effectiveness of the AHC with respect to hazing/fogging. So that the reaction of the AHC to the heated water when the AHC is in contact with water steam and its water-film-forming property can be evaluated 1. This analysis was carried out for a 30 s period. As an alternative to observation the results may be photographed. The observation may be recorded by camera or video.
2. The samples were then ranked as follows:—
   a. Hazy surface, alu-cup-bottom not visible=>AHC fully contaminated
   b. Clear surface, alu-cup-bottom not visible, fine water drops=>AHC is contaminated
   c. Clear surface, alu-cup-bottom visible, large water drops=>AHC might be contaminated
   d. Clear surface, alu-cup-bottom visible, water film=>AHC is not contaminated
3. Silicone Adhesives which are ranked with (c) and (d) (Pass criteria) can be rated as compatible.

A series of standard physical property test were undertaken to ensure the adhesive had the necessary physical properties to function as an adhesive. The results thereof, together with details of the standard test methods followed are also depicted in Table 3.

Lap shear testing was also undertaken as described below
Lap shear Tensile Strength Samples of the base component and catalyst package were mixed in a ratio of 10:1 as previously indicated. Samples of a pre-determined amount of the composition were applied onto a pre-cleaned first substrate (polycarbonate) surface in a laminating apparatus. A second substrate (a previously plasma treated polypropylene) was then placed on top of the composition applied to the first substrate to give a pre-sized lap. The two substrates were compressed and excess composition was removed. The samples of composition in said pre-sized laps sandwiched between the two substrates were cured at room temperature for a period of seven days after which the lap shear tensile strength was determined by pulling the pre-sized laps apart by shear rather than peel (180° pull) at a rate of 2.0 cm/min.

Cohesive failure (CF) is observed when the cured elastomer/adhesive itself breaks without detaching form the substrate surface. It was considered that if the failure was not by CF it was by adhesive failure (AF). Adhesive failure (AF) refers to the situation when a sample detaches cleanly (peels off) from a substrate surface. In some cases a mixed failure mode has been observed: i.e. some areas peel-off (i.e. AF) while some remain covered with cured elastomer/adhesive (i.e. CF). In such instances the portion displaying CF (% CF) is recorded (bearing in mind % CF+% AF=100%). The results of all the tests on compositions made using comparative catalyst packages 1 to 4 are provided in said Table 3 below. Following the above, the adhesive material remaining on the substrates were subjected to a peel test whereby one end of each sample assessed is undercut on the square down to the surface with a clean razor blade or the like. A tab is produced on each sample which is then held between the fingers and thumb and then smoothly pulled at about 90 degrees until there is either adhesive or cohesive failure.

TABLE 3

Properties of Compositions made using Base (Table 1 and the catalyst package of Table 2 post mixing in a 10:1 ratio)

| Characteristic | Comp. 1 | Comp. 2 | Comp. 3 | Comp. 4 |
| --- | --- | --- | --- | --- |
| Commercial AHC 1 compatibility 7 d RT | hazy cond. | hazy cond. | no haze | no haze |
| Commercial AHC 2 compatibility 7 d RT | hazy cond. | hazy cond. | no haze | no haze |
| Tack free time (min) (ASTM 2377-94) | | | >180 | 120 |
| Shore A Hardness (ASTM D2240-97) 7 d RT cure time | | | 14 (tacky) | 22 (slight tack) |
| Elongation (%) (ASTM D412-98a) 7 d RT cure time | | | 886 | 616 |

TABLE 3-continued

Properties of Compositions made using Base (Table 1 and the catalyst package of Table 2 post mixing in a 10:1 ratio)

| Characteristic | Comp. 1 | Comp. 2 | Comp. 3 | Comp. 4 |
|---|---|---|---|---|
| Tensile Strength (MPa) (ASTM D412-98a) 7 d RT cure time | | | 1.22 | 1.85 |
| Lap Shear Strength Adhesion PC/plasma PP after 7 days aging at RT (MPa) | | | 1.38 | 1.51 |
| Cohesive Failure on polycarbonate (%) | | | 50 | 100 |
| Cohesive failure polypropylene (%) | | | 100 | 100 |
| Lap Shear Strength Adhesion PC/plasma PP after aging at 60° C. and/ 90% RH for 14 days (MPa) | | | 0.66 | 0.89 |
| Cohesive Failure on polycarbonate (%) after lap shear | | | 60 | 70 |
| Cohesive Failure on polycarbonate (%) after subsequent peel test | | | 60 | 70 |
| Cohesive Failure on polypropylene (%) | | | 50 | 60 |

It was identified that both comparatives 1 and 2 failed to pass the anti-haze coating test. Given this they were discounted as unsuitable and no further analysis of these materials was undertaken. Comparatives 3 and 4 did however generate formulations which passed the anti-haze coating test and therefore were analysed further. However, compositions made using comparative catalyst packages 3 and 4 were considered unsuitable because they (i) cured too slowly for headlamp assembly processes as may be appreciated given they had a tack free time much greater than 60 minutes e.g. of at least 120 minutes and indeed were found to have remained "sticky" after a 7 day curing period; and (ii) had a lap shear strength of <1 MPa after a 14 day period at 60° C. and 90% relative humidity.

Examples of acceptable catalyst packages as described in accordance with the composition herein together with two further comparatives are depicted in Table 4.

TABLE 4

| Ingredients | Ex. 1 (wt. %) | Ex. 2 (wt. %) | Comp. 5 (wt. %) | Comp. 6 (wt. %) |
|---|---|---|---|---|
| Trimethyl terminated polydimethylsiloxane 60,000 mPa · s | 70.21 | 68.53 | 65.28 | 62.51 |
| Carbon black | 16.04 | 15.65 | 14.91 | 14.27 |
| Treated silica | 0.80 | 0.78 | 0.75 | 0.72 |
| DMDTN catalyst | 0.61 | 0.59 | 0.57 | 0.54 |
| Tetraethylorthosilicate (iv) | 7.64 | 8.687 | 10.58 | 12.29 |
| Ethylenediaminepropyltrimethoxysilane (v) | 4.70 | 5.77 | 7.91 | 9.67 |
| Weight ratio of (iv):(v) | 1.63:1 | 1.5:1 | 1.34:1 | 1.27:1 |
| Mix ratio of Part A:Part B (parts by weight) | 100:10 | 100:10.25 | 100:10.74 | 100:11.23 |

Compositions made from the base material depicted in Table 1 together with example catalyst packages 1 and 2 and comparative catalyst packages 5 and 6 were prepared by mixing the base with each catalyst package in a 10:1 weight ratio. The resulting compositions were tested for their physical properties as depicted in Table 5 below.

TABLE 5

| Characteristic | Ex. 1 | Ex. 2 | Comp. 5 | Comp. 6 |
|---|---|---|---|---|
| Commercial AHC 1 compatibility 7 d RT | no haze | no haze | hazy cond. | hazy cond. |
| Commercial AHC 2 compatibility 7 d RT | no haze | no haze | hazy cond. | hazy cond. |
| Tack free time (min) (ASTM 2377-94) | 39 | 23 | 10 | 6 |
| Shore A Hardness 1 h (ASTM D2240-97) | 14 | 22 | 24 | 22 |
| Lap Shear Strength Adhesion PC/plasma PP after 7 days aging at RT (MPa) | 1.47 | 1.37 | 1.23 | 1.19 |
| Cohesive Failure on polycarbonate (PC) (%) after lap shear and subsequent peel test | 100 | 100 | 100 | 100 |
| Cohesive failure on polypropylene (PP) (%) after lap shear and subsequent peel test | 100 | 100 | 100 | 100 |
| Lap Shear Strength Adhesion PC/plasma PP after aging at 60° C. and/ 90% RH for 14 days (MPa) | 1.02 | 1.08 | 1.21 | 1.17 |

TABLE 5-continued

| Characteristic | Ex. 1 | Ex. 2 | Comp. 5 | Comp. 6 |
|---|---|---|---|---|
| Cohesive Failure on polycarbonate (%) after lap shear | 80 | 100 | 100 | 100 |
| Cohesive Failure on polycarbonate (%) after subsequent hand peel | 80% CF | 0 | 0 | 0 |
| Cohesive Failure on polypropylene (%) | 50 CF | 100 | 100 | 100 |
| Shore A Hardness (ASTM D2240-97) | 28 | 30 | 31 | 31 |
| Elongation (%) (ASTM D412-98a) | 545 | 490 | 380 | 312 |
| Tensile Strength (MPa) (ASTM D412-98a) | 2.31 | 2.31 | 2.06 | 1.83 |

As will be observed in the above both examples 1 and 2 passed the anti-haze coating test described above unlike comparatives 5 and 6. It will be seen that compositions made using the catalyst packages of comparatives 5 and 6 gave hazing subsequent to the anti-haze testing and therefore were deemed unacceptable for the current need. Examples 1 and 2 also had an acceptable tack free time however the composition of example may require to be applied on a pre-treated surface to enhance adhesion on some substrates.

What is claimed is:

1. A two-part condensation curable adhesive composition for adhering a front lens having an inner surface coated with an anti-haze coating to a lamp body to provide a sealed lamp unit, the adhesive composition comprising a base part, Part A, and a catalyst package, Part B, wherein Part A comprises:
   (a) a siloxane polymer having at least two hydroxyl or hydrolysable groups per molecule or a silyl modified organic polymer having at least two $(R^5)_m(Y^1)_{3-m}$—Si groups per molecule, where each $R^5$ is a hydroxyl or a hydrolysable group, each $Y^1$ is an alkyl group containing from 1 to 8 carbons, and m is 1, or 3, and where the organic polymer is selected from the group consisting of polyethers, hydrocarbon polymers, acrylate polymers, polyesters, polyurethanes and polyureas; and
   (b) a reinforcing filler;
   and
   wherein Part B comprises:
   (i) a polydialkylsiloxane which is unreactive with polymer (a) in Part A, with the polydialkylsiloxane, having the general formula:

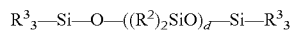

where each $R^2$ is an alkyl group or a phenyl group, each $R^3$ is independently selected from the group consisting of alkyl, phenyl, alkenyl, and alkynyl groups, and d is an integer which provides a viscosity of from about 5 to about 100,000 mPa·s at 25° C.;
   (ii) optionally, a reinforcing filler;
   (iii) a tin based catalyst;
   (iv) a cross-linker having the structure $Si(OR)_4$ where each R is an independently selected alkyl group containing from 2 to 10 carbon atoms; and
   (v) an adhesion promoter of the structure

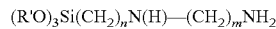

where each R' is an independently selected alkyl group containing from 1 to 10 carbon atoms, n is from 2 to 10, and m is from 2 to 10; and wherein once cured in place, residual ingredients from the adhesive composition or by-products of cure reactions thereof do not visibly inhibit functionality of the anti-haze coating of the sealed lamp unit.

2. The two-part condensation curable adhesive composition in accordance with claim 1, wherein the reinforcing filler (b) in Part A is a precipitated calcium carbonate and the optional reinforcing filler (ii) in Part B is precipitated calcium carbonate or fumed silica.

3. The two-part condensation curable adhesive composition in accordance with claim 1, wherein Part B comprises cross-linker (iv) in an amount of from 1 to 30% by weight, and/or adhesion promotor (v) in an amount of from 1.0 to 10% by weight, each based on Part B.

4. The two-part condensation curable adhesive composition in accordance with claim 1, wherein two, three or all R groups in cross-linker (iv) are the same and have 2 to 6 carbon atoms, and/or adhesion promoter (v) is selected from (ethylenediaminepropyl) trimethoxysilane, (ethylenediaminepropyl) triethoxysilane or a mixture thereof.

5. The two-part condensation curable adhesive composition in accordance with claim 1, wherein a pigment/non-reinforcing filler is present in an amount of from 1 to 30% by weight of Part B.

6. The two-part condensation curable adhesive composition in accordance with claim 5, wherein the pigment/non-reinforcing filler is carbon black.

7. The two-part condensation curable adhesive composition in accordance with claim 1, wherein Part B comprises:
   the polydialkylsiloxane (i) in an amount of from 30 to 70.5 weight %;
   the optional reinforcing filler (ii) in an amount of from 0 to 10 weight %;
   the tin based catalyst (iii) in an amount of from 0.01 to 3 weight %;
   the cross-linker (iv) in an amount of from 1 to 30 weight %;
   the adhesion promoter (v) in an amount of from 1.0 to 10 weight %; and
   colored filler or pigment in an amount of from 0 to 30 weight %;
   with the total weight % of Part B being 100 weight %.

8. The two-part condensation curable adhesive composition in accordance with claim 1, wherein polymer (a) is the siloxane polymer.

9. The two-part condensation curable adhesive composition in accordance with claim 1, wherein:
   the weight ratio of cross-linker (iv) to adhesion promoter (v) in Part B is at least 1.5:1, or optionally is from 1.5:1 to 2:1; and/or
   once Part A and Part B are combined, the adhesive composition has a tack free time of less than 60 minutes, or optionally less than 40 minutes, in accordance with ASTM 2377-94 using a polyethylene film.

10. A lamp having a lamp body defining a lamp chamber containing a light source and having a front opening, and a front lens to engage into the front opening, the front lens having an inner surface which further defines the lamp chamber, the inner surface being coated with an anti-haze coating, wherein the front lens is adhered to the lamp chamber by a cured adhesive formed from the two-part condensation curable adhesive composition according to claim 1.

11. The lamp in accordance with claim 10, wherein: the weight ratio of cross-linker (iv) to adhesion promoter (v) in Part B is at least 1.5:1, or optionally is from 1.5:1 to 2:1; and/or once Part A and Part B are combined, the adhesive composition has a tack free time of less than 60 minutes, or optionally less than 40 minutes, in accordance with ASTM 2377-94 using a polyethylene film.

12. The lamp in accordance with claim 10, wherein the lamp body is made from polybutylene terephthalate, cast aluminum, acrylonitrile butadiene styrene, polypropylene, ethylene propylene diene monomer rubber, polyphenylene sulfide, polyether ether ketone or a composite thereof, low density polyethylene, high density polyethylene, polyamide, acrylic-styrene-acrylonitrile, or polybutylene terephthalate or a composite thereof.

13. The lamp in accordance with claim 10, wherein the front lens is made from polycarbonate or poly(methyl methacrylate).

14. The lamp in accordance with claim 10, wherein the outer surface of the front lens is treated with a scratch resistant coating.

15. The lamp in accordance with claim 10, wherein minimal or no haze can be observed on the inner surface of the front lens subsequent to cure of the adhesive composition.

16. A method for making the lamp in accordance with claim 10, the method including the steps of: providing the lamp body and the front lens; engaging the front lens into the front opening of the lamp body to form a joint; and sealing the joint between the front lens and the lamp body with the adhesive composition by mixing Part A and Part B to form a mixture, applying the mixture onto the joint between the front lens and the lamp body and causing or allowing the adhesive composition to cure.

17. The method in accordance with claim 16, wherein minimal or no haze can be observed on the inner surface of the front lens subsequent to cure of the adhesive composition.

18. The lamp in accordance with claim 10, further defined as at least one of an outdoor light, a decorative light, or a vehicle lamp.

19. The lamp in accordance with claim 18, further defined as a vehicle lamp selected from the group consisting of headlamps, brake lamps, running lamps, turn signal lamps, fog lamps, back-up lamps and parking lamps.

20. An adhesive comprising the reaction product of the two-part condensation curable adhesive composition in accordance with claim 1.

* * * * *

UNITED STATES PATENT AND TRADEMARK OFFICE
CERTIFICATE OF CORRECTION

PATENT NO. : 11,814,553 B2  
APPLICATION NO. : 17/288506  
DATED : November 14, 2023  
INVENTOR(S) : Michael Hartmann et al.

Page 1 of 1

It is certified that error appears in the above-identified patent and that said Letters Patent is hereby corrected as shown below:

In the Claims

Column 25, Claim 1, Line 33:
"and m is 1, or 3,"
Should read:
--and m is 1, 2, or 3,--

Column 25, Claim 1, Line 41:
"with the polydialkylsiloxane, having"
Should read:
--with the polydialkylsiloxane having--

Column 28, Claim 16, Line 6:
"by mixing Part A and Part B to form"
Should read:
--by mixing Part A and Part B together to form--

Signed and Sealed this  
Twenty-second Day of October, 2024

Katherine Kelly Vidal  
*Director of the United States Patent and Trademark Office*